United States Patent [19]
Sadiq et al.

[11] Patent Number: 6,032,153
[45] Date of Patent: Feb. 29, 2000

[54] METHOD AND SYSTEM FOR MAINTAINING PERSISTENCE IN A SHARED OBJECT SYSTEM

[75] Inventors: Waqar Sadiq, Rochester Hills; Fred Arthur Cummins, Farmington Hills; Steven H. Marney, Lake Orion, all of Mich.; William Earl Swift, II, Frisco, Tex.

[73] Assignee: Electric Data Systems Corporation, Plano, Tex.

[21] Appl. No.: 09/016,077

[22] Filed: Jan. 30, 1998

Related U.S. Application Data

[60] Provisional application No. 60/065,400, Nov. 13, 1997.

[51] Int. Cl.[7] .................................................... G06F 17/30
[52] U.S. Cl. .............................. 707/103; 707/8; 707/104
[58] Field of Search ................................ 707/103, 104, 707/8

[56] References Cited

U.S. PATENT DOCUMENTS

| | | | |
|---|---|---|---|
| 5,150,308 | 9/1992 | Hooper et al. | 395/500.19 |
| 5,504,895 | 4/1996 | Kurosawa et al. | 707/8 |
| 5,544,353 | 8/1996 | Forman et al. | 707/8 |
| 5,590,326 | 12/1996 | Manabe | 711/150 |
| 5,664,182 | 9/1997 | Nierenberg et al. | 707/102 |
| 5,727,203 | 3/1998 | Hapner et al. | 707/103 |
| 5,809,507 | 9/1998 | Cavanaugh, III | 707/103 |
| 5,893,913 | 4/1999 | Brodsky et al. | 707/201 |

Primary Examiner—Paul R. Lintz
Assistant Examiner—Jean Bolte Fleurantin
Attorney, Agent, or Firm—L. Joy Griebenow; Baker & Botts L.L.P.

[57] ABSTRACT

One aspect of the invention is a method for maintaining persistence in a shared object system. A request is received to update a persistent record of a shared object's state wherein the persistent record of the shared object's state is contained in a database. At least one SQL statement is dynamically generated in response to the request. That statement is generated using a data structure comprising data reflecting at least a portion of the state of the shared object and a map associating attributes to the shared object with the location of those attributes in the database. An SQL statement is then sent to the database.

20 Claims, 2 Drawing Sheets

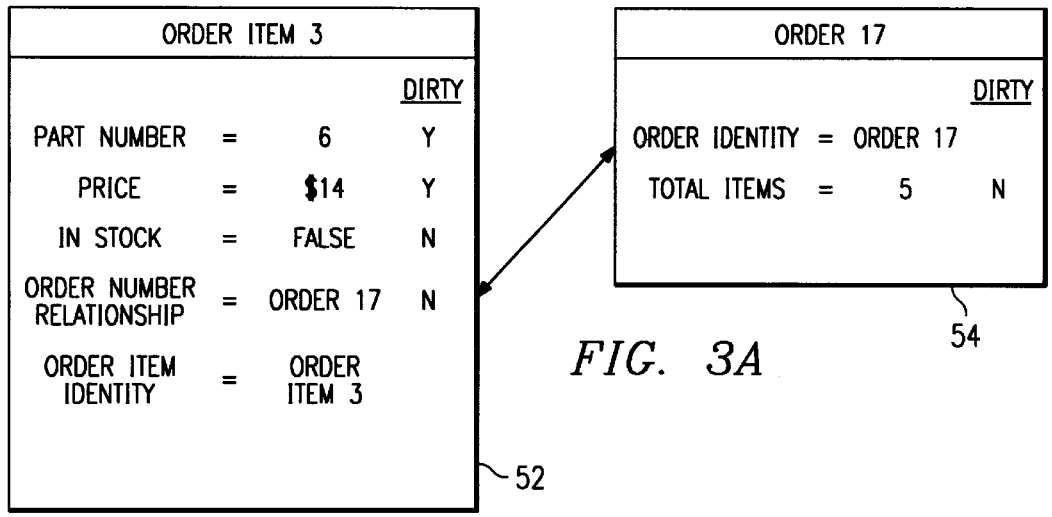
FIG. 3A
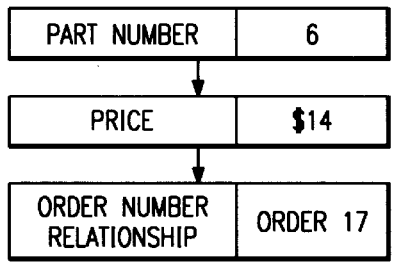
FIG. 3B
FIG. 3C
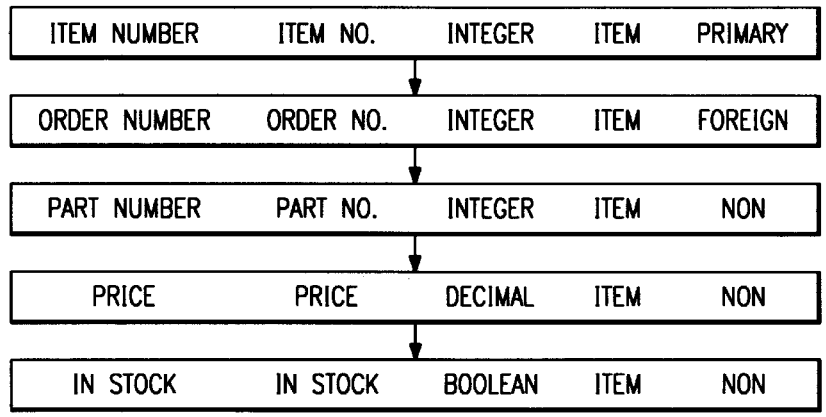
FIG. 3D

METHOD AND SYSTEM FOR MAINTAINING PERSISTENCE IN A SHARED OBJECT SYSTEM

RELATED APPLICATIONS

This application claims the benefit of U.S. provisional application Ser. No. 60/065,400, which was filed on Nov. 13, 1997.

TECHNICAL FIELD OF THE INVENTION

This invention relates generally to object-oriented programming and more particularly to a method and system for maintaining persistence in a shared object system.

BACKGROUND OF THE INVENTION

Some computer applications are so large and the number of users of the applications so large that it makes sense to divide up the work of the application among multiple computers and, potentially, to store the information used by the application in many different places. Such applications are commonly referred to as distributed applications. Conventional distributed applications store shared information in multiple databases that may reside on many different computers.

Recently, however, software developers have begun to create distributed object systems. Distributed object systems comprise objects shared in computer memory and one or more processes running on one or more computers. In distributed object systems, then, an additional shared resource, the distributed object, needs to be accounted for.

Persistence of data is an important attribute in a distributed system. Data is preferably stored in a nonvolatile storage medium so that the system may be both recovered in the event of a failure and restarted in the state in which the system was shut down. A single transaction in a distributed system may update a number of items of data. If only some of the data items are persistently stored while others are not, then the state of the system may not be recoverable.

Maintaining persistence in distributed object systems presents several challenges. A distributed object system may access legacy database systems. For any number of reasons, the distributed object application developer may not wish to structure object relationships in a distributed system in the same way that table relationships exist in legacy databases. In other words, the application developer may wish to divide the data of a single table in the database up among multiple objects in the distributed object system or may wish to combine data from several tables into a single object.

Object relationships provide mechanisms for identifying objects related to each other. Where the state of objects in a distributed object system is persistently maintained in a relational database, such relationships must be converted to corresponding foreign keys in associated tables.

Another problem in maintaining persistence in distributed object systems is that different objects may need to be processed differently for persistence depending upon how their state is stored in the relational database. Thus, application developers may need to create persistence mechanisms unique to each object because of the variation in the relationships between objects and their persistent state stored in a database.

SUMMARY OF THE INVENTION

The invention comprises a method and system for maintaining persistence in a shared object system. The invention is particularly useful in distributed object systems but could be used in other types of systems. One aspect of the invention is a method for maintaining persistence in a shared object system. A request is received to update a persistent record of a shared object state wherein the persistent record of the shared object state is contained in a database. At least one SQL statement is dynamically generated in response to the request. That statement is generated using a data structure comprising data reflecting at least a portion of the state of the shared object and a map associating attributes of the shared object with the location of those attributes in the database. The SQL statement is then sent to the database.

The invention has several important technical advantages. The invention provides a mechanism for maintaining a persistent record of a shared object state in a database that simplifies application development. Because SQL statements are generated dynamically, the invention allows a generic persistence mechanism to be used, rather than a persistence mechanism where SQL statements would be statically generated and customized to each object. The ability of the invention to dynamically generate SQL statements to update a persistent record of a shared object state in a database also allows, optionally, a more efficient update of a shared object state. Only those attributes of an object that have been changed during a transaction can be updated, thus avoiding the inefficiency that is created by rewriting attributes to the database that have not changed in the shared object.

The invention also allows a straightforward mechanism to store an object state in multiple tables in a database, or, in the alternative, to store the state of multiple objects in a single table of the database. The invention thus provides a flexible method for maintaining the persistence of shared objects.

BRIEF DESCRIPTION OF THE DRAWINGS

For a more complete understanding of the present invention and the advantages thereof, reference is now made to the following descriptions, taken in conjunction with the accompanying drawings, in which:

FIGS. 3A–3D illustrate an example shared object, an example relational database table storing the state of that shared object, and example data structures that may be used to update the state of that shared object.

DETAILED DESCRIPTION OF THE INVENTION

Figure 1:
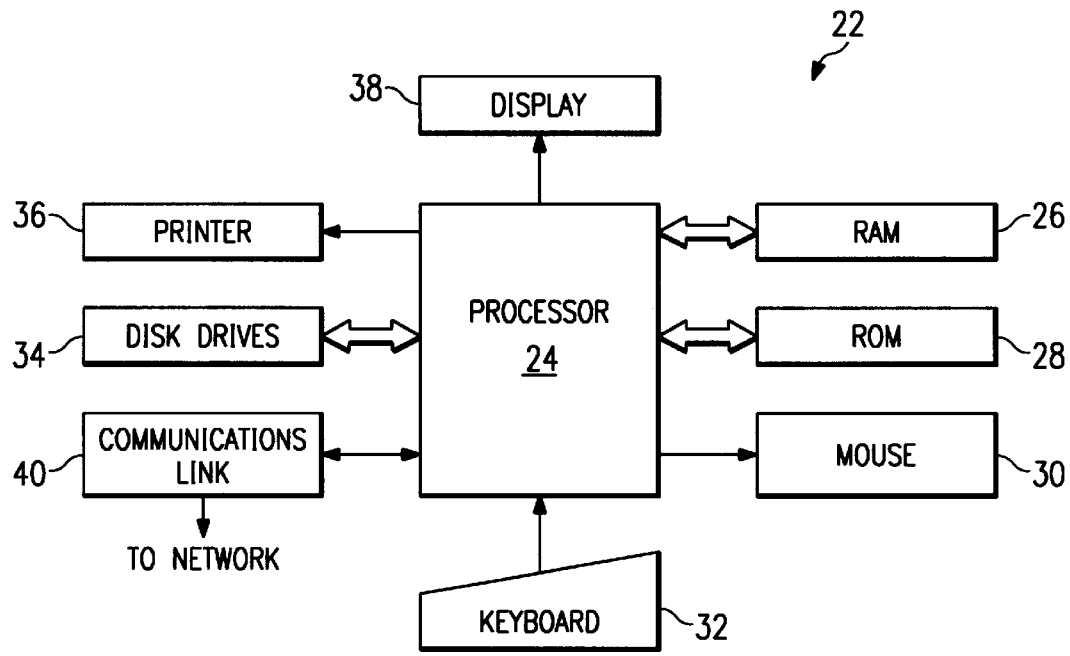
FIG. 1 illustrates an exemplary general purpose computer that may be used to implement the present invention.
Figure 2:
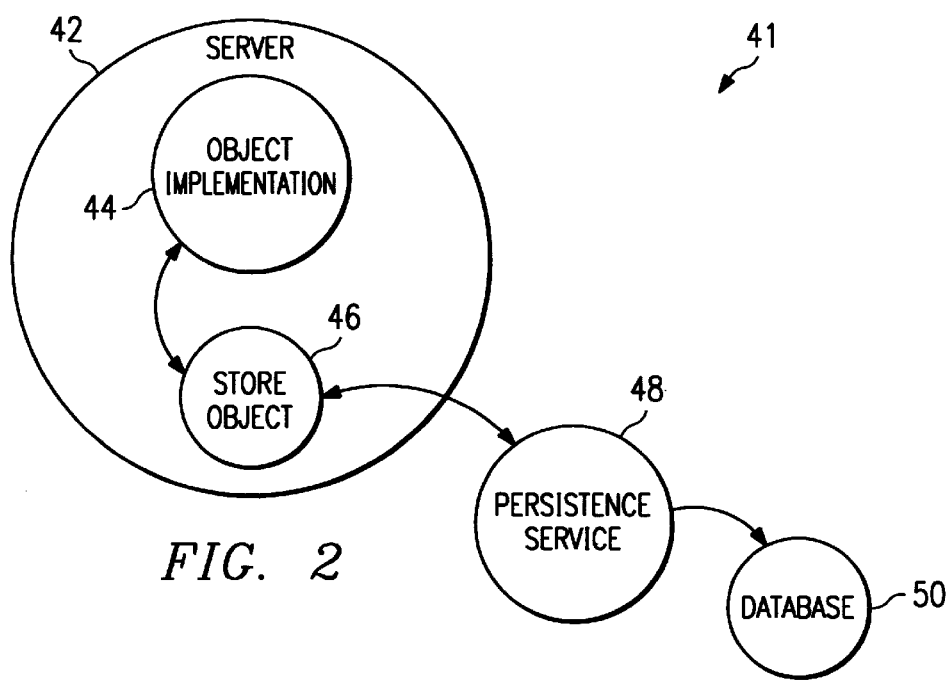
FIG. 2 illustrates an exemplary distributed object system constructed in accordance with the invention.

The preferred embodiment of the present invention and its advantages are best understood by referring to FIGS. 1–3 of the drawings, like numerals being used for like and corresponding parts of the various drawings.

FIG. 1 illustrates a general purpose computer 22 that may be used in a distributed object system created in accordance with the invention. The general purpose computer 22 may be used to execute distributed applications and/or distributed system services in accordance with the invention. General purpose computer 22 may also be used in object systems other than distributed object systems. General purpose computer 22 may be adapted to execute any of the well known OS2, UNIX, MAC-OS, and WINDOWS operating systems or other operating systems. General purpose computer 22 comprises processor 24, random access memory (RAM) 26, read-only memory (ROM) 28, mouse 30, keyboard 32, and input/output devices such as disk drives 34, printer 36, display 38, and communications link 40. The present invention includes programs that may be stored in RAM 26, ROM 28, or disk drives 34 and may be executed by processor 24. Communications link 40 connects to a computer network but could be connected to a telephone line, an antenna, a gateway or any other type of communications link. Disk drives 34 may include a variety of types of storage media, such as, for example, floppy disk drives, hard disk drives, CD ROM drives or magnetic tape drives. Although this embodiment employs a plurality of disk drives 34, a single disk drive 34 could be used without departing from the scope of the invention. FIG. 1 only provides one example of a computer that may be used with the invention. The invention could be used in computers other than general purpose computers, as well as on general purpose computers without conventional operating systems.

FIG. 2 illustrates an exemplary distributed object system 41 constructed in accordance with the invention. Although the invention may be used in any system employing shared objects, it is particularly useful in distributed object systems. Distributed object system 41 comprises a plurality of computers 22 (not explicitly shown) networked together. Any number of computers could be included without departing from the scope of the invention. Data for distributed objects may, for example, be maintained in one or more databases contained in storage media controlled by one or more of the computers 22. Each of the software processes described may run on one or more of the computers 22.

Distributed object system 41 comprises server 42, persistence service 48 and database 50. Multiple servers 42 could be included without departing from the scope of the invention. In addition, the functions of persistence service 48 may be included within server 42. Persistence service 48 could also comprise one or more objects within server process 42. Alternatively, as in this embodiment, persistence service 48 could be a separate process. Persistence service 48 comprises one or more objects operable to maintain persistence of shared objects in distributed object systems 41. In this embodiment, a persistent copy of a shared object's state is maintained in a database such as database 50. Multiple databases 50 may be included in distributed object system 41 without departing from the scope of the invention. Database 50 may comprise a relational database, a hierarchical database, or any other type of database.

In this embodiment, object implementation 44 comprises a shared object that may be accessed by multiple processes (not explicitly shown). A persistent record of its state is maintained in database 50. Store object 46 comprises an interface between object implementation 44 and persistence service 48. The functions of store object 46 could be performed by object implementation 44, server 42 or by persistence service 48 without departing from the scope of the invention.

A process modifies a distributed object such as object implementation 44 and does so using a transaction service (not explicitly shown) in the context of a transaction. In a distributed object system, the term transaction generally refers to an object transaction comprising a unit of work such that all of the work is either made permanent as a group or rolled back together. Accordingly, a transaction may include one or more updates to one or more shared objects and one or more updates to one or more databases. A persistent record of a shared object's state is normally updated at the completion of a transaction.

Object implementation 44 (or, alternatively, store object 46) maintains a map associating attributes of object implementation 44 with the location of those attributes in database 50. This map may be maintained anywhere in the distributed object system without departing from the scope of the invention. Although the map could be any type of data structure, this embodiment employs a list of records for the map. Each record comprises an attribute name, a column name, a value type, a table name, a key type, and a system assigned key indicator. More or less information could be included in each record in the map without departing from the scope of the invention. The attribute name refers to the name of the attribute of the shared object as that object is stored in memory. The column name refers to the name of the column in the database in which the attribute is stored. The value type refers to the data type of the attribute (e.g., integer, real, boolean, string, character). The table name refers to the name of the table in the database in which the persistent record of the object's state is stored. The key type refers to the type of key (if any) that the attribute represents in the database. The system assigned key indicator indicates whether or not the attribute is a system assigned key or not. In this example, the record is used to map an object to a relational database. A different type of record may be appropriate if the object is mapped to some other type of database. The database name may also be included in the map. In addition, a map may include one or more database stored procedure names. These procedures could be executed rather than generating all the SQL statements required for an update.

In operation, server 42 receives an indication that a transaction which has changed the state of object implementation 44 is complete. Object implementation 44, after receiving such notification, sends a message to store object 46 to invoke a method to store the state of object implementation 44. When the store method is invoked, store object 46 requests object implementation 44 for its state and map (as the map is maintained by object implementation 44 in this embodiment). Object implementation 44 returns its state and map to store object 46. Store object 46 supplies the map and state information to persistence service 48 and requests for the state of object implementation 44 to be updated in database 50. Persistence service 48 executes an update method to accomplish the update using the map and state that was received from store object 46. After the state has been updated, persistence service 48 returns an update successful indication.

In this embodiment, persistence service 48 may include a database manager (not explicitly shown) which provides an interface to database 50. Persistence service 48 dynamically generates SQL statements to write out the state of object implementation 44 to the database. A description of the dynamic generation process may now be explained.

First, however, a description of how object implementation 44 saves its state will be given. In one embodiment, object implementation 44 maintains a dirty indicator for each of its attributes. A dirty indicator is used to indicate when an attribute has been changed by a particular transaction. At the conclusion of the transaction, only those attributes that have been changed may then be sent to persistence service 48 for updates to database 50. The dirty indicator may be set to indicate that an attribute is dirty when the attribute is changed and set to indicate that the attribute is not dirty when database 50 is updated to reflect a change in the attribute. Thus, when persistence service 48 indicates that an object state has been successfully stored in database 50, object implementation 44 may then clear the dirty bits for each of its attributes.

Certain attributes, however, may be treated differently. For example, each shared object may maintain the identifiers of related objects as attributes. In one embodiment, because each object may be responsible for updating its own state using persistence service 48, these relationships may be updated in database 50 even if they have not changed. Alternatively, a dirty indicator could be used for each attribute in a list of relationships and the identifiers for related objects only passed through persistence service 48 for updates if those identifiers have changed. The object identifiers are important, however, as identifiers of related objects may serve as foreign keys in a relational database table to associate the persistent record of an object with the persistent record of another object stored in another table of the database.

Although any data structure could be used to pass the state of object implementation 44 to persistence service 48, one embodiment may employ a list or array of name/value pairs. Again, different types of data structures and different information could be included in the data structure without departing from the scope of the invention. Each name/value pair comprises the name of the attribute and its current value. As discussed above, in one embodiment, dirty bits are used so that this data structure contains only those attributes that have been changed since the last persistence update. In an alternative embodiment, each attribute of the object could be placed in the data structure and each attribute written out to database 50 without regard to whether that attribute was changed or not. In another embodiment, the data structure may include those attributes that have been changed since the last persistence update as well as all object identifiers representing a relationship to another object whether or not that identifier has changed since the last persistence update.

Persistence service 48 may dynamically generate SQL statements to update the object state in database 50 using the data structure and map. To dynamically generate an SQL statement, persistence service 48 traverses the data structure and for each name/value pair, searches for the entry in the map corresponding to the attribute name in the name/value pair. The map information may then be used to generate the SQL statement and the value from the name/value pair placed in the statement as the update value. Because the object identifier for object implementation 44 may be used as a primary key in a table in database 50, the object identifier for object implementation 44 is also passed by store object 46 to persistence service 48 for the purpose of dynamically generating SQL statements. Persistence service 48 may determine which database maintains the persistent record of object implementation 44 using either entries in the map for object implementation 44, using a value passed along with the update request to persistence service 48, or by maintaining a data structure associating object identifiers and the database providing persistent storage for those objects. Any of these methods or other methods could be used without departing from the scope of the invention.

FIGS. 3A–3D illustrate an exemplary shared object, an exemplary relational database table, and an exemplary map and data structure constructed in accordance with the invention. This example will be used to further illustrate the operation of one embodiment of the invention. In this embodiment, dirty indicators are used so that only object attributes changed by a transaction are stored by persistence service 48. In this example, order item object 52 and order object 54 comprise shared objects. Order object 54 represents a purchase order while order item represents one of the items on the purchase order. In this example, order item has an identifier "order item 3." This identifier may be created, for example, using a system assigned key generated by the database providing persistent storage for order item object

52. Similarly, order object 54 has an identifier of "order 17" which, again, may be generated using a system assigned key.

In this embodiment, order item object 52 has the following attributes: part number, price, in stock, order number relationship, and order item identity. Order number relationship comprises an identifier of the order object with which the order item is associated. Order item identity comprises the identifier for order item object 52 itself. Order object 54 has an order identity attribute comprising the identifier for the object itself as well as a total items attribute.

The example of FIG. 3 will be used to illustrate the update of order item object 52 where its part number and price have been changed by a transaction. In this embodiment, all related object identifiers are included in the data structure 56 of name value pairs along with all other attributes that have been changed. For order item object 52, the dirty indicator is set for part number and price. Thus, the data structure 56 generated by order item object 52 reflecting its state comprises three name value pairs: one for part number, one for price, and one for order number relationship. This data structure will be used along with map 60 to dynamically generate SQL statements to be used to update relational database table 58.

Map 60 comprises a list of records. In this embodiment, the record contains five items: the attribute name, the database column name, the data type, the database table name, and the key value. Optionally, the database name and/or an indicator as to whether a key is a system assigned key or not could be included. Other items could be included in each record or some of these items excluded without departing from the scope of the invention.

To dynamically generate an SQL statement, persistence service 48 would traverse data structure 56 and generate one or more SQL statements for each attribute in the data structure. To generate the SQL statement, persistence service 48 may use the attribute name from the data structure, look that attribute name up in the map, and retrieve the record from the map to obtain the information needed to generate the SQL statement. Here, a single SQL statement would be generated for all of the attributes in data structure 56. Relational database table 58 is the item table and the results of the dynamically generated SQL statements comprising the update are illustrated in FIG. 3. Note that "item no." comprises the primary key for the item table and the database while "order no." comprises a foreign key.

Although the present invention has been described in detail, it should be understood that various changes, substitutions, and alterations can be made hereto without departing from the spirit and scope of the invention as defined by the appended claims.

What is claimed is:

1. A method for maintaining persistence in a shared object system, comprising:

receiving a request to update a persistent record of a shared object's state wherein the persistent record of the shared object's state is contained in a database;

dynamically generating at least one SQL statement in response to the request, the SQL statement generated using a data structure comprising data reflecting at least a portion of the state of the shared object and a map comprising a plurality of entries, each entry associating an attribute of the shared object with the location of that attribute in the database; and sending the SQL statement to the database.

2. The method of claim 1, wherein the sending of the SQL statement causes at least one change in the persistent record of the shared object's state.

3. The method of claim 1, wherein the map comprises a list of records, each record associated with an attribute of the shared object and comprising the attribute name, database column name, data type, database table name, and key type.

4. The method of claim 3, wherein each record further comprises a system assigned key indicator.

5. The method of claim 1, wherein the data structure comprises a plurality of name/value pairs, each name/value pair comprising an attribute name and the current value of the attribute having that attribute name in the shared object.

6. The method of claim 1, wherein the data structure comprises attributes that have been changed wherein those changes are not reflected in the database.

7. The method of claim 6, wherein the data structure further comprises object identifiers comprising identifiers of objects related to the shared object.

8. The method of claim 6, wherein a dirty indicator is associated with each attribute of the shared object, the dirty indicators used to create the data structure, and wherein an attribute's dirty indicator is set to indicate dirty when the attribute is changed and set to indicate not dirty when the database is updated to reflect a change in the attribute.

9. The method of claim 1, wherein the data structure comprises each attribute of the shared object that is persistently maintained by the database.

10. The method of claim 5, wherein the map comprises a list of records, each record associated with an attribute of the shared object and comprising the attribute name, database column name, data type, database table name, and key type.

11. The method of claim 10, wherein the data structure comprises attributes that have been changed wherein those changes are not reflected in the database.

12. A shared object system, comprising:
   a data structure comprising data reflecting at least a portion of the state of a shared object;
   a map comprising a plurality of entries, each entry associating an attribute of the shared object with the location of that attribute in a database; and
   an update method operable to receive a request to update a persistent record of a shared object's state wherein the persistent record of the shared object's state is contained in the database, dynamically generate at least one SQL statement in response to the request, the SQL statement generated by using the data structure and the map, and
   send the SQL statement to the database.

13. The shared object system of claim 12, wherein the map comprises a list of records, each record associated with an attribute of the shared object and comprising the attribute name, database column name, data type, database table name, and key type.

14. The shared object system of claim 12, wherein the data structure comprises a plurality of name/value pairs, each name/value pair comprising an attribute name and the current value of the attribute having that attribute name in the shared object.

15. The shared object system of claim 12, wherein the data structure comprises attributes that have been changed wherein those changes are not reflected in the database.

16. The shared object system of claim 12, further comprising:
   a dirty indicator associated with each attribute of the shared object, the dirty indicators used to create the data structure, and wherein an attribute's dirty indicator is set to indicate dirty when the attribute is changed and set to indicate not dirty when the database is updated to reflect a change in the attribute.

17. The shared object system of claim 16, wherein the data structure is created in response to a transaction and wherein an attribute is placed in the data structure during such creation if its dirty indicator is set to indicate dirty.

18. The shared object system of claim 17, wherein the data structure at least one object identifier is placed in the data structure during creation of the data structure, the object identifier representing an object related to the shared object.

19. The shared object system of claim 12, wherein the data structure comprises each attribute of the shared object that is persistently maintained by the database.

20. The shared object system of claim 16, wherein the map comprises a list of records, each record associated with an attribute of the shared object and comprising the attribute name, database column name, data type, database table name, and key type.

* * * * *